(12) United States Patent
Söderberg (10) Patent No.: US 6,483,210 B1
(45) Date of Patent: Nov. 19, 2002

(54) ROTARY ELECTRIC MACHINE

(75) Inventor: Christer Söderberg, Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/489,849

(22) Filed: Jan. 24, 2000

(30) Foreign Application Priority Data

Jan. 26, 1999 (SE) .............................................. 9900227

(51) Int. Cl.⁷ ................................................. H02K 9/00
(52) U.S. Cl. ............................ 310/52; 310/61; 310/216
(58) Field of Search ............................... 310/52, 54, 59, 310/61, 60 A, 254, 216, 261

(56) References Cited

U.S. PATENT DOCUMENTS

| | | |
|---|---|---|
| 1,739,137 A | 12/1929 | Gay |
| 4,499,660 A * | 2/1985 | Lenz ............................ 29/598 |
| 4,739,202 A * | 4/1988 | Hatanaka et al. .............. 310/52 |
| 4,908,537 A * | 3/1990 | Sismour, Jr. .................. 310/51 |
| 4,922,147 A * | 5/1990 | Sismour, Jr. et al. ......... 310/61 |
| 5,189,325 A * | 2/1993 | Jarczynski .................... 310/54 |
| 5,563,460 A | 10/1996 | Ammar |
| 5,861,700 A * | 1/1999 | Kim ............................ 310/261 |
| 6,091,168 A * | 7/2000 | Halsey et al. .................. 310/61 |

FOREIGN PATENT DOCUMENTS

SE 660 263 A5 3/1987

\* cited by examiner

Primary Examiner—Nestor Ramirez
Assistant Examiner—Thanh Lam
(74) Attorney, Agent, or Firm—Dykema Gossett, PLLC

(57) ABSTRACT

The invention relates to a method of improving the performance of a rotary electric machine through improved cooling, whereby a cooling fluid is conducted through axial cooling channels (15) in the rotor, radially inwardly of the rotor winding grooves (14), whereby the cooling fluid being mainly active in cooling the machine is conducted through axial cooling channels (15), or alternatively groups of cooling channels, that are provided essentially symmetrically with reference to the magnetic flow paths in the rotor, for achieving a symmetry in the magnetic circuit and thereby good electrical properties for the machine. The invention is also directed to a rotary electric machine, a rotor therefor and a use thereof.

35 Claims, 10 Drawing Sheets

ROTARY ELECTRIC MACHINE

TECHNICAL FIELD

The present invention relates generally to rotary electric machines, for motor operation as well as for generator operation, and specifically relates to a method of optimizing the performance utilization of electric machines, a rotary electric machine, a use of such a machine and a rotor for such a rotary electric machine.

BACKGROUND

The development within this area is presently directed towards an ever higher output in terms of power and torque, for given machine sizes. This means that manufacturers of such machines are pressed, primarily by the current tough price competition, to increase the performance of the machines so that smaller machines that are less expensive to manufacture may be employed for a given range of power output.

In conventionally designed machines such a development towards electric machines having higher and higher performance utilization, that is an increased output of power and torque, has led to increased dimensions for the rotor winding conductors and to the coherent increased dimensions for the rotor winding grooves, especially with reference to the radial depth of the grooves. To a great extent this depends upon the fact that in such machines it has not been possible to obtain a cooling that is so efficient that the size of the rotor winding grooves can be kept down.

Figure 1:
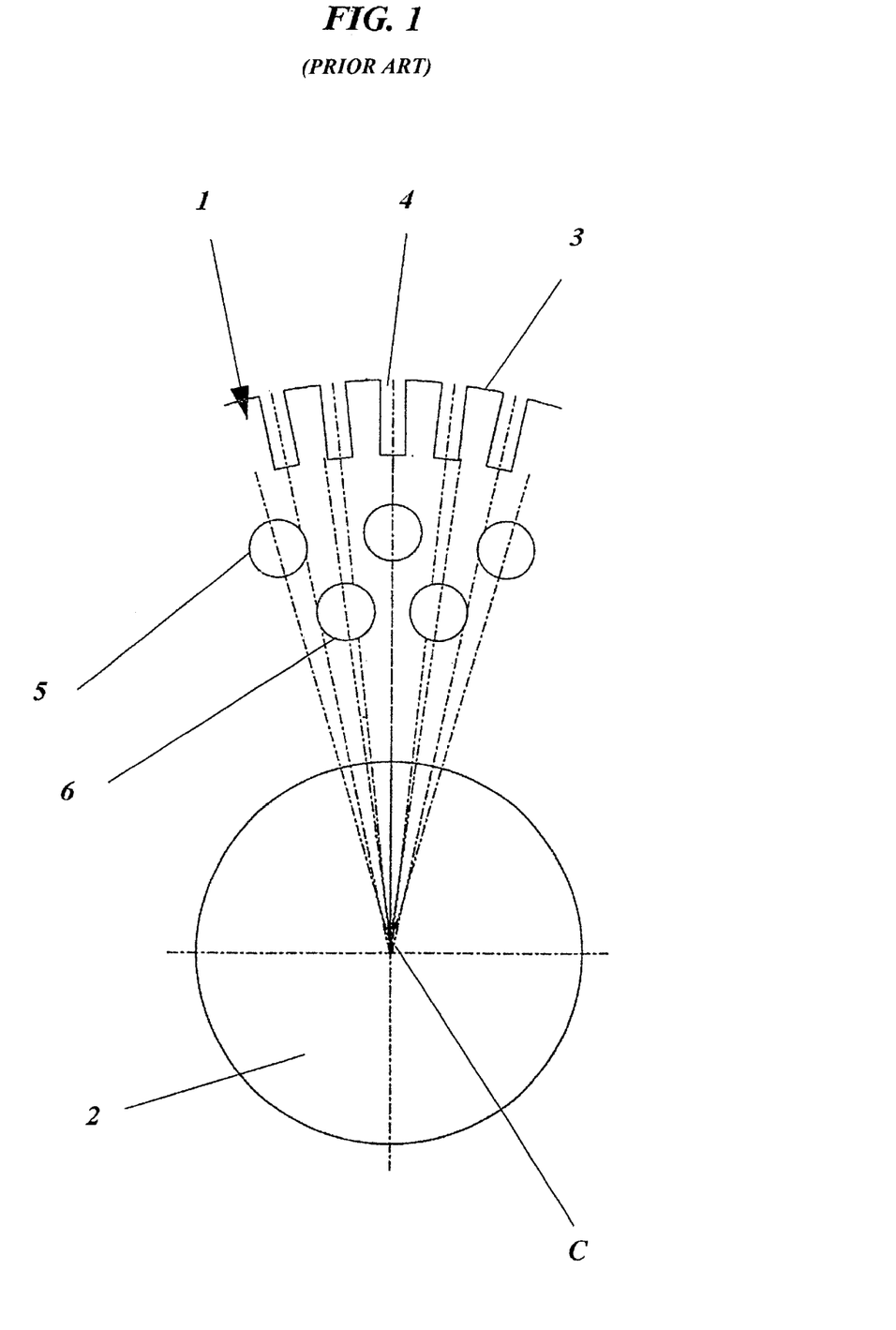
FIG. 1 very schematically illustrates a partial plan view of a rotor plate of a rotary electric machine, said rotor plate being provided with a cooling hole configuration in accordance with the prior art, FIG. 2 in a view corresponding to that of FIG. 1 illustrates a first embodiment of a cooling hole configuration in accordance with the invention.

To exemplify this it can be mentioned that in direct current machines the conventional cooling is based on axial cooling channels 5, 6 provided in accordance with a standardized hole configuration in the rotor 1, i.a. such as it is illustrated in the enclosed FIG. 1. In the normal case the same hole configuration is employed for all of the different numbers of winding grooves 4 used for a given rotor diameter in a particular series of motors. Thereby the number of cooling holes or channels being positioned at the same radial distance from the centre C of the shaft is normally an integer multiple of the pole number of the machine, in order to provide a relatively constant summated flow in the magnetic circuit through the rotor, irrespective of the polar position of the rotor. Expressed in an other way, the number of outer cooling channels as well as the number of inner cooling channels are each an integer multiple of the pole number. Since the number of winding grooves varies and is normally not divisible with the pole number, the distances between the rotor winding grooves and the rotor cooling channels will not be the same anywhere around the circumference of the rotor. This in turn leads to the fact that the magnetic circuit will have an unequal flow distribution at the respective winding grooves around the circumference of the rotor. In order to minimize the negative effects thereof upon the electrical properties of the machine, the distance between the winding grooves and the cooling channels must be designed relatively large, with the accompanying poor cooling and greatly limited power and torque output.

In order to increase the power and torque output from such a direct current machine having a conventional cooling hole configuration in the rotor, in accordance with the above, the rotor conductor area and thereby the dimensions of the winding grooves must be increased, as stated above. Simultaneously the distances between the winding grooves and the cooling channels must be made smaller. However, due to the above described unequal flow distribution, said measures impair the electric properties of the machine, which in particular results in a considerably decreased commutation capacity at high power outputs. Thereby, it is not unusual for rotary electric direct current machines having a conventional cooling, to be impaired by such substantially increased electrical strain or stress that the contact function between the brush and commutator reaches an upper limit. In the absence of any margin for this contact function, the direct current motor becomes very sensitive to external disturbance.

To sum up, it may therefore be established that the conventional design in itself has performed well, with the above discussed limitations. However, it is based on the unfortunate compromise between on the one hand a desire to achieve an efficient cooling and, on the other hand the aim towards providing a machine having good electrical properties.

SUMMARY OF THE INVENTION

In the light of the above discussion, a basic object of the invention is to provide a simple method of combining high performance in a rotary electric machine with an improvement of the electrical properties thereof. Expressed otherwise, the aim is to eliminate the need to compromise between efficient cooling and good electrical properties. To be precise, this object is obtained specifically for a direct current machine by providing wide black bands, that is low commutation strain for the electric machine in order to thereby obtain a functionally stable operation with low maintenance.

The invention is based on the understanding that the need for said compromise can be eliminated and that, instead, the cooling and the electrical properties can both be optimized simultaneously by creating symmetry in the magnetic circuit of the motor. According to the invention this is achieved by providing at least the mainly effective, outer axial cooling channels in the rotor of the machine essentially symmetrically with reference to the magnetic flow paths in the rotor. Thereby a symmetrical design of the magnetic circuit of the machine is obtained, whereby a good electromechanical motor function is obtained with, for a direct current machine, low maintenance of brushes and commutator. Simultaneously wide shunt regions can be obtained without reduction of the rated output.

In one embodiment of the invention the symmetrical design of the magnetic circuit, according to the basic object of the invention, is combined with the provision of a great number of outer cooling channels in the rotor, positioned near the rotor winding grooves, that is at a large radial distance from the centre of the rotor shaft. By combining the symmetry of the magnetic circuit and the large number of outer cooling channels a very good possibility is provided for improving the performance utilization of a rotary electric machine. In particular this improvement is achieved by the fact that the good electrical properties provided in accordance with the basic object of the invention can be maintained and even improved further by means of the increased cooling capacity that in turn permits the reduction of the size of the winding grooves. Through the symmetrical positioning of the cooling channels they can be provided in a large number and at the same time they can be moved up close to the winding grooves and thereby close to the source of the power loss in the form of resistive loss in rotor conductors in rotor winding grooves and magnetic or iron loss in rotor groove teeth.

In accordance with further preferred embodiments of the invention the outer cooling channels are provided in a number corresponding to half of the number of rotor winding grooves when the latter is even, or alternatively in a number that is an integer multiple of the number of rotor winding grooves.

In accordance with a further embodiment the cooling channels are provided with an enlarged inner peripheral surface and/or cross section area. This is obtained partly by the positioning of the cooling channels further out from the centre of the shaft of the machine, which allows for cooling channels having a larger cross section area, and partly by giving the cooling channels an elongated form, as seen in the radial direction, and/or forming them with a profiled, for instance polygonal or wavy surface.

Hereby a further improved cooling capacity is obtained, which permits raising the current density in the rotor winding. This in turn contributes further to the reduction of the dimensions of the rotor winding grooves. For a direct current machine this means that the commutation strain can be reduced.

Other advantages that are obtained by means of the invention are that the temperature gradient radially through the rotor plate can be reduced. This means that, compared to plates having a conventional cooling configuration, larger rotor plates can be cold-pressed on the rotor shaft since the shaft hole of the rotor plate does not expand so much in the operating temperature condition, that the grip between the shaft and the rotor plate is lost. In these embodiments the cooling surfaces are increased and provided closer to the heat source/power loss source, which means that temperature peaks in the winding grooves can be reduced at temporary overloads.

According to another aspect of the invention a rotor for a rotary electric machine is provided, which employs the principles of the present invention.

A further aspect of the invention relates to the use of a rotary electric machine designed in accordance with the basic principles of the invention, for motor operation.

Further objects, features and advantages of the invention are indicated in the dependent claims and in the following description of exemplifying embodiments thereof.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 2:
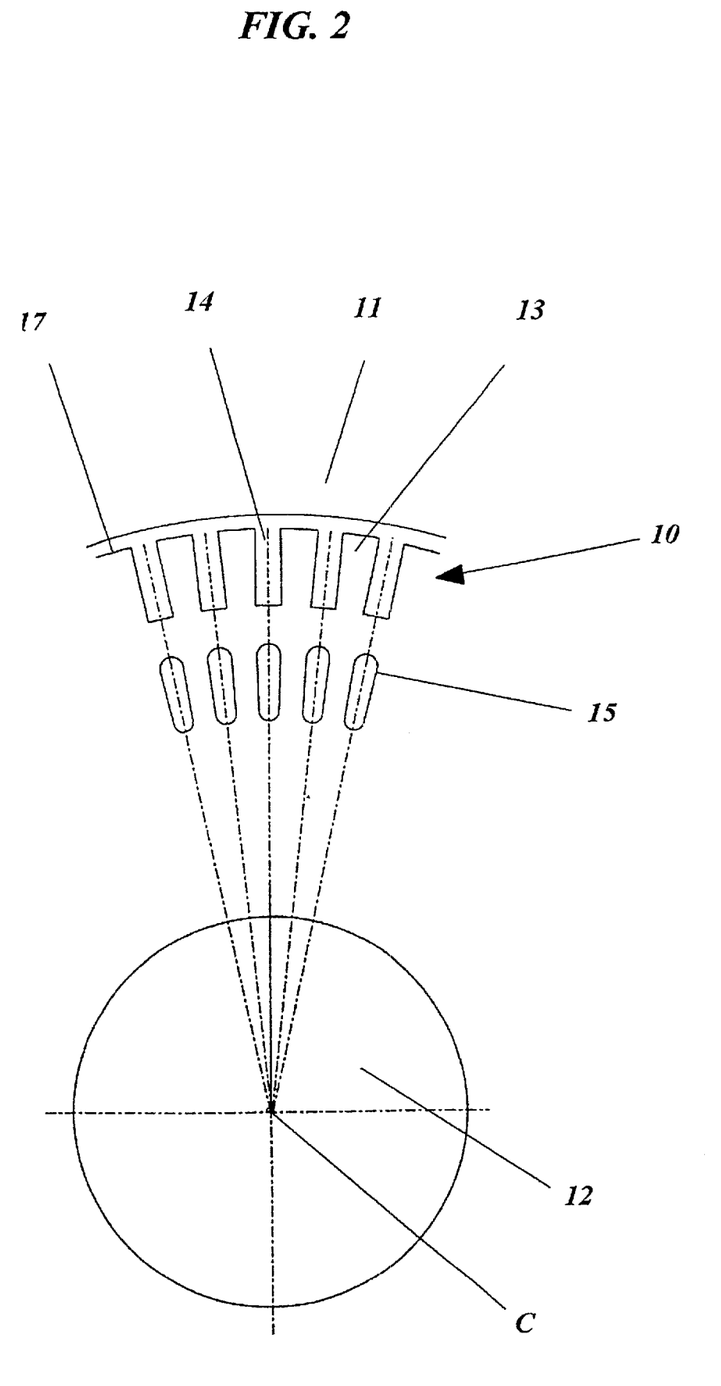
Figure 3:
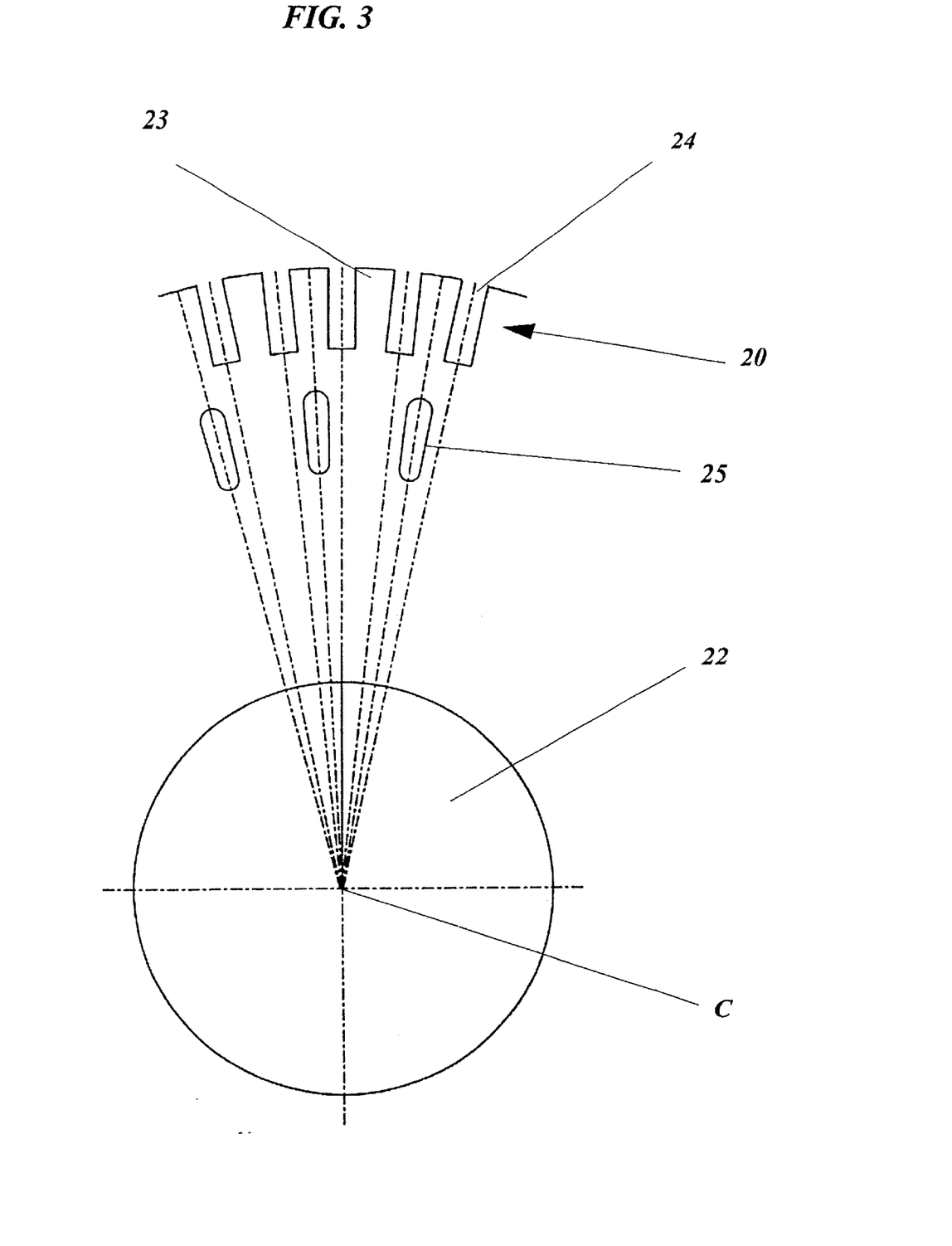
FIG. 3 illustrates an alternative embodiment of the cooling hole configuration according to the invention.

With reference primarily to FIGS. 1–3 the basic principles of the invention shall now be described with the aid of two embodiments (FIGS. 2–3) of the application thereof to direct current machines. At the same time the differences in comparison with conventionally designed direct current machines (FIG. 1) shall be explained. In all of these figures, as well as in FIGS. 4–7 and 10 the invention is illustrated by means of a very schematically shown radial portion of a rotor plate in a laminated rotor of a direct current machine. It is understood that the rotor plates of a plate stack are provided with the same cooling hole configuration and with the cooling holes aligned with each other for forming axial cooling medium channels.

As is stated in the introduction the basic object of the invention is to provide symmetry in the magnetic circuit of the electric machine. In the first embodiment of the present invention (illustrated in FIG. 2) this is achieved by providing those cooling channels 15 of the rotor plate 10 that are mainly active in cooling the machine, symmetrically in relation to the rotor winding grooves 14. It shall be explained, in this connection, that the cooling channels 15 that are mainly active in the cooling are the outer cooling channels, that is those positioned closest to the rotor winding grooves 14. In order to achieve the objects of the invention it is therefore essential that in particular the cooling channels 15 that are mainly active in the cooling, are positioned symmetrically. Consequently the invention also covers embodiments where other cooling channels, that are of secondary importance for the cooling, are positioned in a non-symmetrical manner, at a smaller radial distance from the centre C of the rotor shaft 12 and/or are provided with another spacing or pitch than the main cooling channels 15.

For achieving the symmetry provided in accordance with the invention, the cooling channels 15 are, in the embodiment illustrated in FIG. 2, provided in a number corresponding to the number of rotor winding grooves 14, and thus corresponding to the number of groove teeth 13. This allows for symmetry, whether the number of rotor winding grooves 14 is odd or even.

With the cooling hole configuration designed in accordance with the invention the cooling channels can be provided in a greater number in comparison with the conventional technique, and they can be positioned further outwardly from the centre C of the rotor shaft 12, which in itself provides space for larger cooling channels. Through the enlarged surface on one hand and by being positioned closer to the source of the power loss, that is the heat source, on the other hand, the cooling channels can therefore provide an essentially improved cooling, without disturbing or impairing the electrical properties.

In the embodiment of FIG. 2 the cooling channels 15 are formed having a radially elongated shape for providing a further increased cooling surface. However, said enlargement of the surface can also be obtained in other ways, as is exemplified in FIGS. 11b and 11c by means of the polygonal and wavy shapes of the inner surface of the cooling channels illustrated therein.

In contrast to the above described embodiment of the present invention, the conventionally punched rotor plate 1 illustrated in FIG. 1 has relatively few outer cooling channels 5 positioned comparatively far from the rotor winding grooves 14 and from the groove teeth 3 lying therebetween.

Moreover, an array of inner cooling channels 6 is provided at a smaller radial distance from the centre C of the rotor shaft.

The cooling hole configuration illustrated in FIG. 1 is conventional in today's direct current motors which, as mentioned, are normally formed having the same standardized hole configuration for all of the different number of winding grooves used for a given rotor diameter in a certain series of motors. In the normal case, the number of outer cooling holes 5 as well as the number of inner cooling holes 6 are each an integer multiple of the number of poles of the machine. The purpose thereof is to provide a relatively constant summated flow in the magnetic circuit through the rotor, irrespective of the polar position of the rotor. This means that the number of outer cooling channels 5 as well as the number of inner cooling channels are each an integer multiple of the number of poles. In consequence thereof, the distances between the rotor winding grooves 4 and the rotor cooling channels 5, 6 will not be equal anywhere around the circumference of the rotor. As was mentioned above, in order to avoid an uneven flow distribution in direct current machines having a conventional cooling hole configuration, it must be seen to that the distance between the winding grooves 4 and the cooling channels 5, 6 is relatively large, with the resulting poor cooling and limited output of power and torque.

Figure 8:
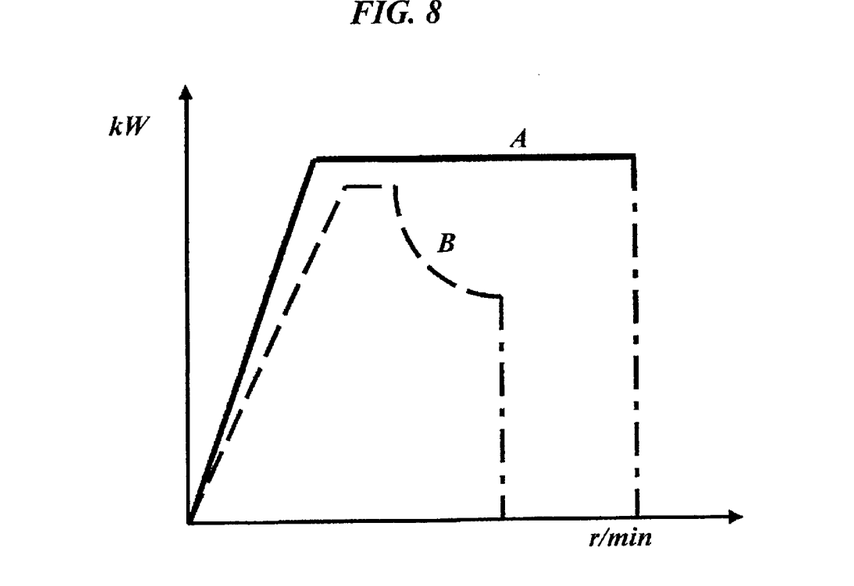
FIG. 8 is a diagram illustrating differences in field weakening area for direct current machines having high and low, respectively, commutation strain.
Figure 9:
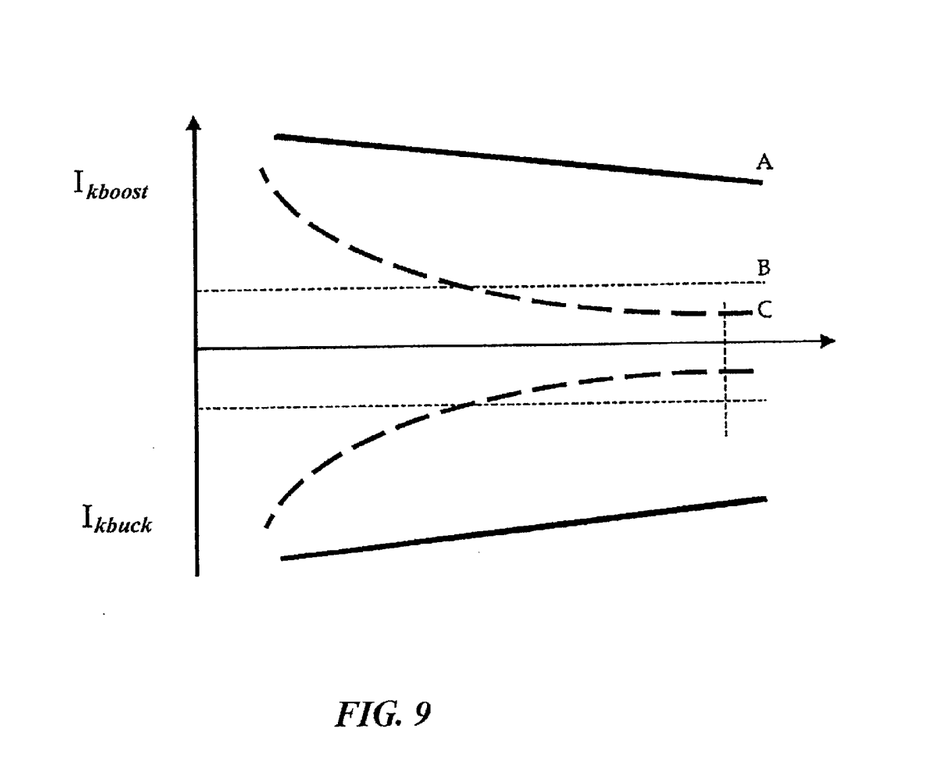
FIG. 9 is a diagram illustrating differences in black bands between conventionally designed direct current motors and a machine according to the invention.

The improvements in the form of enhanced electrical properties that are achieved by means of the principles of the invention are illustrated more clearly in FIG. 8 and 9. FIG. 8 illustrates a comparison between the performance of a direct current motor designed in accordance with the principles of the present invention (curve A) and a direct current motor produced in accordance with the conventional technique (curve B). FIG. 9 illustrates a comparison between the black bands of a direct current motor designed in accordance with the principles of the present invention (curve A) and of a direct current motor of the conventional design (curve B).

Initially it should be stated, with reference to FIG. 8, that generally, high commutation strain greatly restricts the possibility to provide speed control for direct current motors through "field weakening", and that when a wider field weakening area is required for a direct current motor having high commutation strain, the rated power must be reduced. This means that the motor must have a higher original power rating than a motor having such low commutation strain that its output does not have to be reduced in order to provide for a speed control through field weakening.

FIG. 8 specifically indicates the differences in the field weakening area of the conventional motor having high commutation strain according to curve B, compared to a motor according to the invention, having low commutation strain. There are indeed direct current motors available on the market, which have relatively high performance in relation to the size of the motor, but in most cases these motors are characterized by a small shunt area corresponding to FIG. 8. Only a small number of direct current motors available on the market present field weakening areas like the one of curve A, for the motor according to the invention, but in such cases they usually have significantly lower performance relative to the size of the motor.

One the other hand, a distinguishing feature of a direct current motor designed in accordance with the principles of the present invention is that very high rated output and very high torque at rated load may be taken out at the same time as the field weakening area, that is the range of speed with constant power, is wide.

For direct current motors with speed control through voltage control or direct current motors operated with a relatively constant speed low commutation strain is also desirable, since this is a basic condition for obtaining a functionally stable operation with low maintenance. With a conventional design and at high performance the result is often small, narrow black bands, that is the result is a small area within which the direct current motor operates sparkless when a certain disturbance in the form of an applied or tapped current (boost, buck, see FIG. 9) is introduced over the commutation circuit. In connection with high performance utilization it may even come to the situation where the black bands nearly disappear. It has been stated above, that curve B in FIG. 9 specifically illustrates typical black bands for such a conventional direct current motor and these should be compared to curve E that shows the black bands required for obtaining a functionally stable operation with low maintenance. The black bands according to curve B are sufficient for obtaining a sparkless operation in a laboratory environment, but a higher level according to curve E is required to avoid sparking or arcing in practical operation where disturbance in the form of current ripple, environmental influence upon the patina, mechanical vibration from the operation etc. are added. Otherwise sparking will occur, causing wear on both brushes and commutator and thereby requiring increased maintenance.

On the contrary, stable and wide black bands within the entire operating range are characteristic of rotary electric motors produced in accordance with the principles of the present invention. This is illustrated in curve A, and it is clearly visible that the black bands are definitely better for the motor according to the invention than for the conventional motor. This applies even if only the conventional motor would be provided with a compensating winding in the stator, with the additional cost involved. To sum up, the wide black bands obtained with a rotary electric direct current motor designed in accordance with the principles of the invention provide the following advantages in relation to a typical conventional direct current motor:

Eliminated sparking and thereby reduced brush wear, reduced commutator wear and reduced need for cleaning from coal dust caused by brush wear Reduced need for inspection during operation Increased availability through extended intervals between shutdowns for maintenance and service Increased ability to withstand the additional disturbance in the form of black band reduction, that is caused by the current pulsation of the converter, ripple, in both the armature circuit and the field circuit Increased ability to withstand the additional disturbance in the form of black band reduction, that is caused by mechanical vibration Makes it possible to maintain a sparkless operation even in the case where brushes having inferior black bands must be used as a result of current operational conditions.

FIG. 3 illustrates an alternative embodiment of the cooling hole configuration according to the invention, whereby the outer cooling channels 25 in this case are provided at the same radial distance from the centre C of the rotor shaft 22 and in a number corresponding to half the number of rotor winding grooves 24. In this case positioning the cooling channels on a radius passing centrally through every other groove tooth 23 provides the symmetry in relation to the flow paths.

Figure 4:
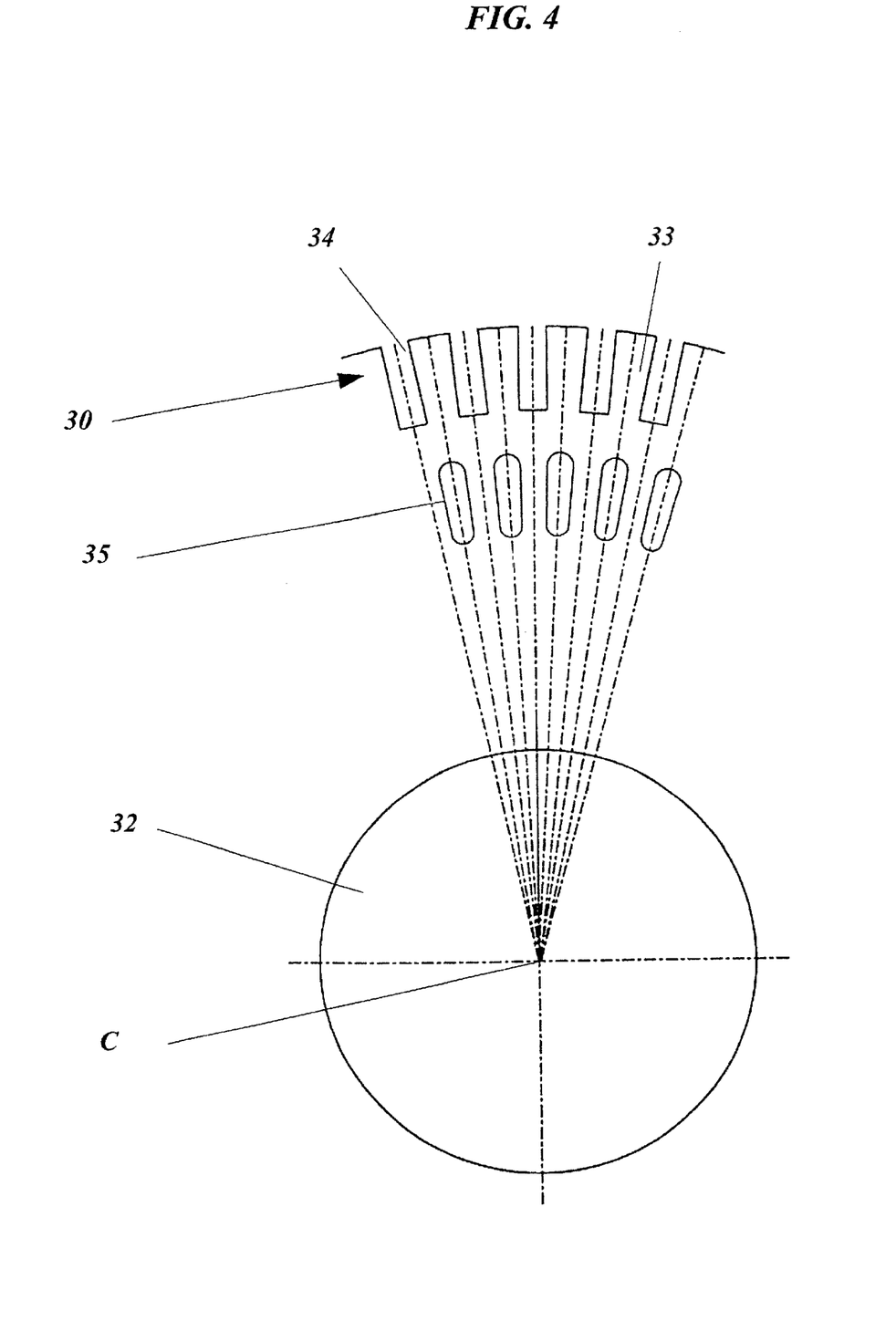
FIGS. 4–7 illustrate further variants of the inventive cooling hole configuration.

FIG. 4–7 illustrate further alternative embodiments of the cooling hole configuration according to the invention, whereby the embodiment according to FIG. 4 corresponds to that of FIG. 2 in the respect that the outer cooling channels 35 are provided in a number corresponding to the number of rotor winding grooves 34, whether the number of grooves is even or odd. However, the outer cooling channels 35 are displaced in relation thereto, such that they are positioned on a radius from the centre C of the rotor shaft 32 and through the centre of each groove tooth 33.

Figure 5:
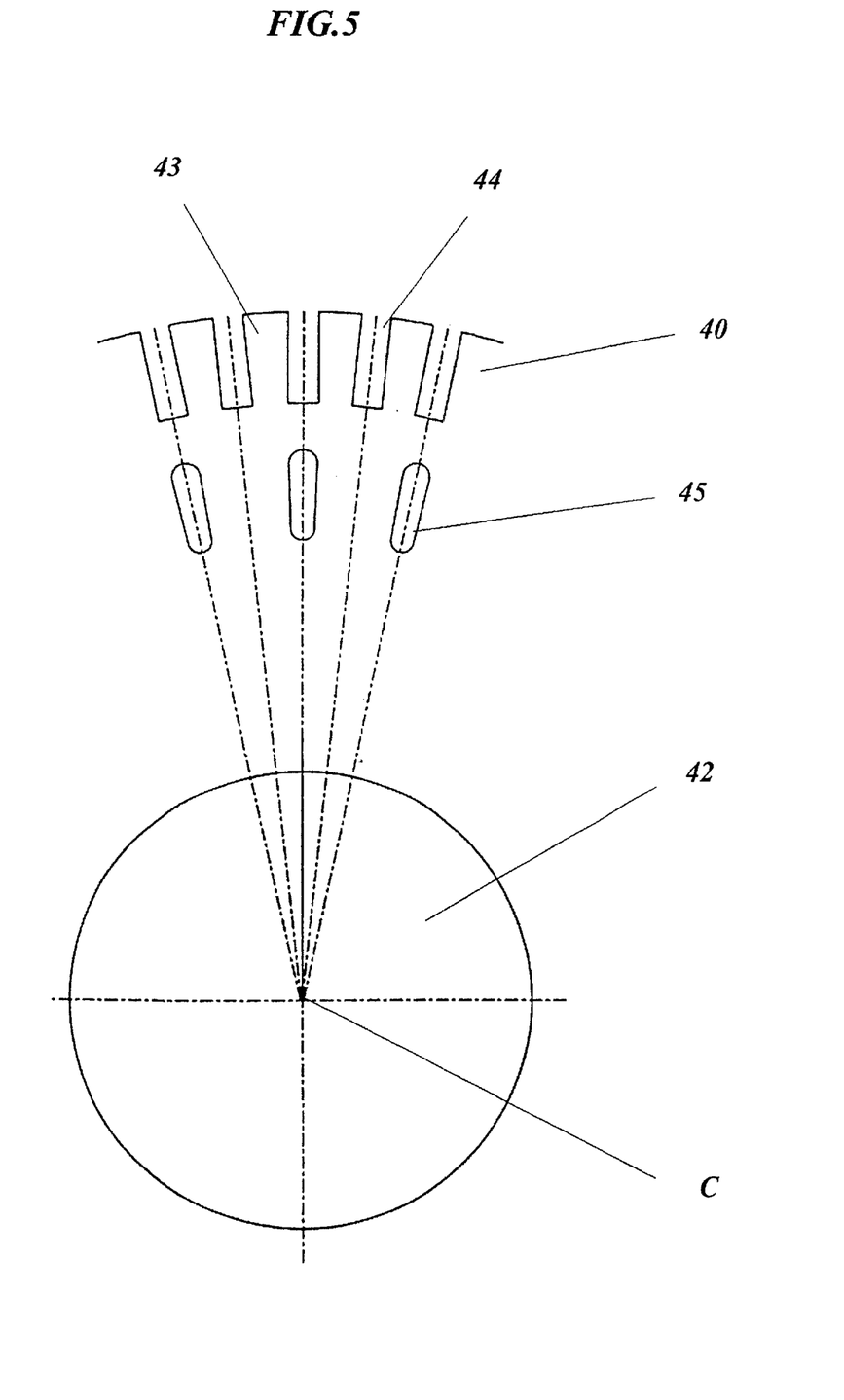

The embodiment according to FIG. 5 corresponds to that of FIG. 3 in the respect that here too the number of cooling channels 45 corresponds to half the number of rotor winding grooves 44 in the rotor plate 40. The difference is that the cooling channels 45 are here positioned on a radius from the centre C of the rotor shaft 42 through the centre of every other rotor winding groove 44.

Figure 6:
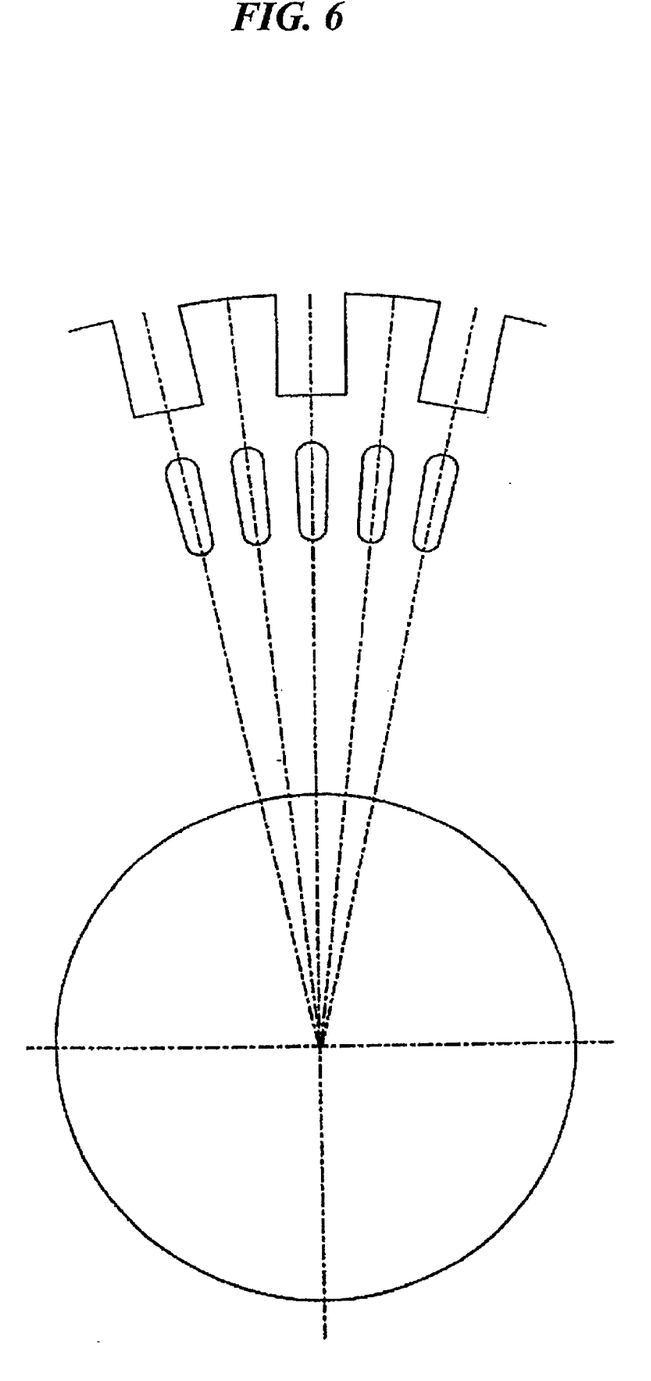
Figure 7:
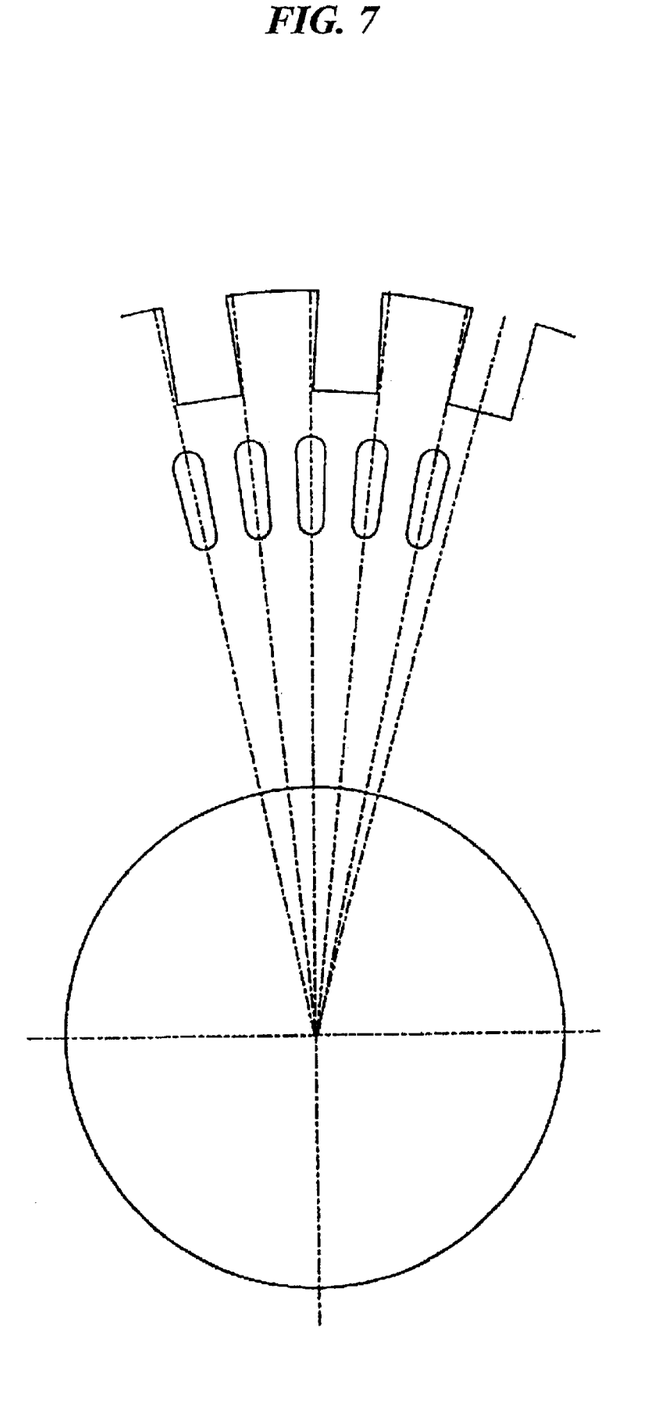

According to the principles of the invention the number of outer cooling channels can be another integer multiple of the number of rotor grooves, for instance three, four, five, six and so forth, times the number of rotor winding grooves, and this is generally illustrated in FIGS. 6 and 7. Said figures illustrate two different embodiments having double the number of cooling channels as the number of rotor winding grooves, but with the cooling channels positioned either in line with each rotor winding groove and in line with each groove tooth (FIG. 6), or with one cooling channel provided at each transition from a groove to a groove tooth.

Figure 10:
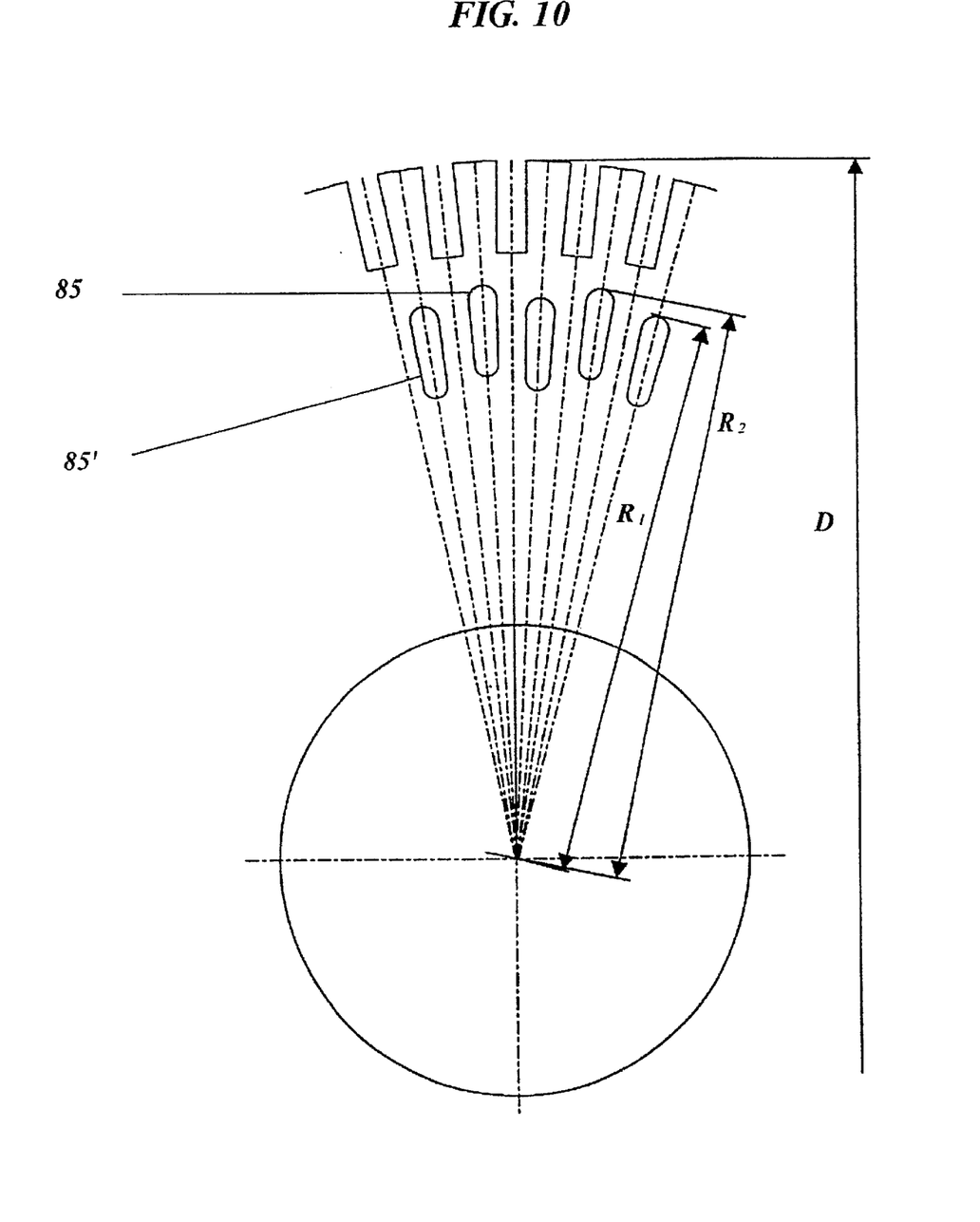
FIG. 10 illustrates a further alternative embodiment of the cooling hole configuration according to the present invention.

In the embodiments of the invention illustrated in FIGS. 2–7 those outer cooling channels 15 of the rotor plate 10 that are mainly active in the cooling, and that are positioned closest to the rotor winding grooves are all provided at the same radial distance from the center of the rotor shaft. However, the invention is not restricted to such a design. In order to illustrate this FIG. 10 shows an embodiment where the cooling channels 85, 85', which in this example are provided in the same manner as those in FIG. 4 with respect to their number and polar position, are provided displaced in relation to each other in the radial direction of the rotor. Expressed otherwise, they are provided at two different radial distances $R_1$ and $R_2$ from the center of the rotor shaft. In this specification these distances are calculated starting from the point on the cooling channel wall being closest to the outer circumference of the rotor plate.

Figure 11A:
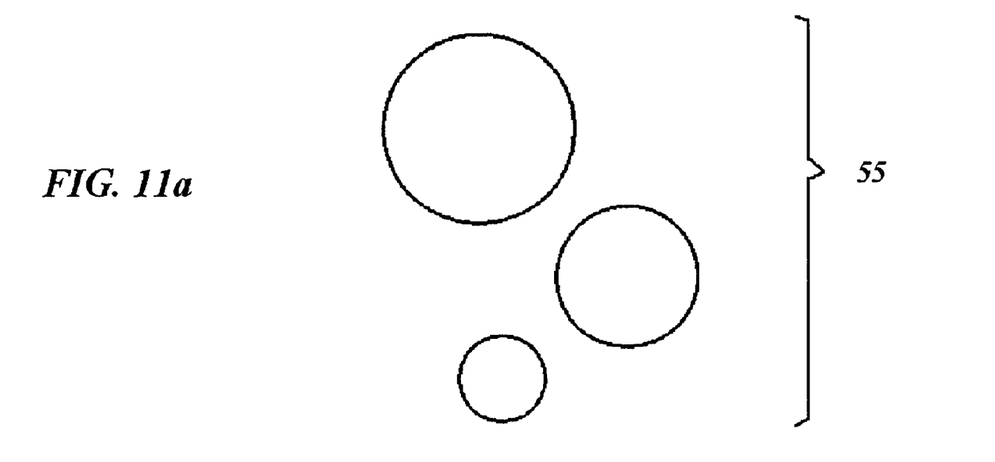
FIGS. 11a–c illustrate examples of alternative embodiments of cooling channels.
Figure 11B:
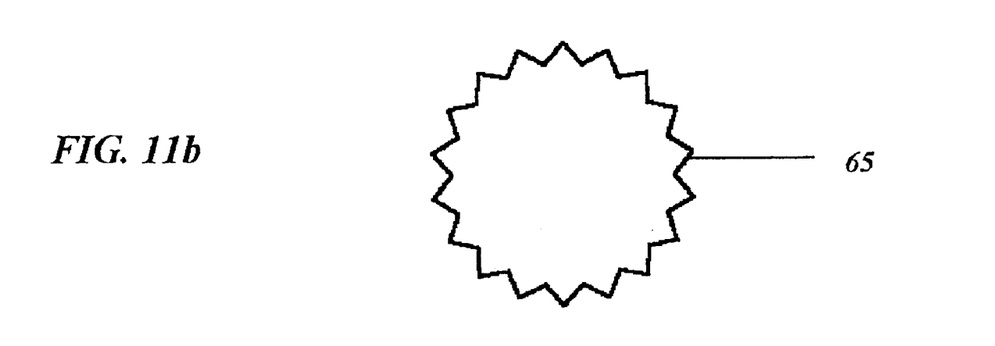
Figure 11C:
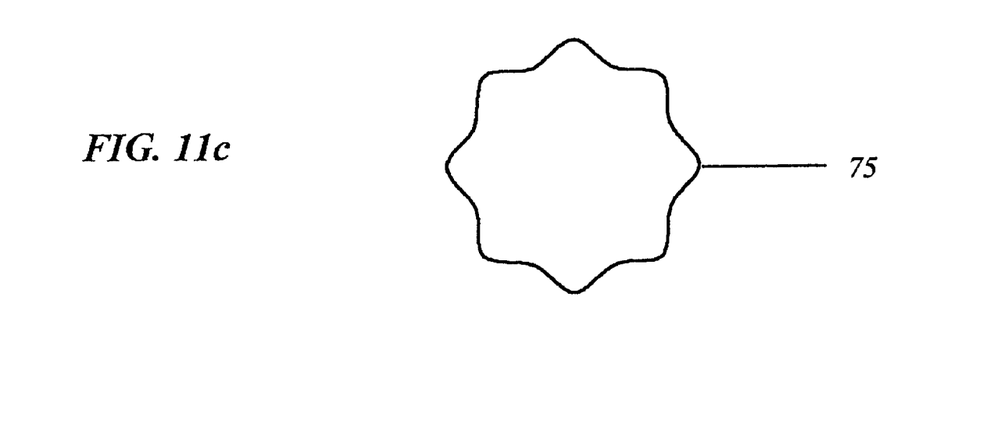

It shall be emphasized that the principles of the embodiment in FIG. 10 may as well be applied to designs where the number and polar position of the cooling channels correspond to those according to any of the other embodiments of FIGS. 2, 3, 5, 6 or 7, and/or where they are of another shape than that illustrated in FIGS. 2–7 and for instance correspond to that of FIGS. 11a–c.

Therefore, the embodiment of FIG. 10 generally exemplifies that in accordance with the invention the expressions "outer cooling channels that are mainly active" or "cooling channels closest to the rotor winding grooves" comprise all cooling channels positioned between the two radiuses $R_1$ and $R_2$ when these lie in the area $R_2-R_1 \leq 8+D\cdot 0.03$, where $R_2$ and $R_1$ denote radiuses from the center C of the shaft in mm and D is the diameter of the rotor plate in mm and where $R_2$ is always the larger of the two radiuses.

Especially in the cases where high demands are made on the cooling of the rotor it is particularly advantageous if all "outer cooling channels that are mainly active" or "cooling channels closest to the rotor winding grooves", in a variant of the embodiment in FIG. 10, are positioned between the two radiuses R2 and R1 when these lie in the narrower area $R_1 \leq 5 \mp D\cdot 0.02$ mm.

Another variant of the invention is illustrated in FIG. 11a, where the separate outer cooling channels of FIG. 2–7 have been replaced by a group of cooling channels 55 of which each may be asymmetrically positioned, but which when looked upon as a group, fall within the basic inventive idea. In this figure is illustrated a group 55 consisting of three channels, but the number can be from two and upwards, with the upper limit being determined by practical restrictions.

In the embodiments of FIGS. 2–7 the separate cooling channels have been illustrated having a radially elongated shape, in addition to the surface enlargement obtained by the positioning at a comparatively large radial distance from the center of the rotor shaft. FIG. 11b and 11c illustrate alternative embodiments for obtaining this further surface enlargement by providing a polygonal shape, the cooling channel 65 according to FIG. 11b, or a wavy shape, the cooling channel 75 of FIG. 11c, for the inner peripheral surface of the outer cooling channels. It is obvious that the invention covers also other shapes than those specifically illustrated.

The invention is presently regarded as having its major field of application in connection with a machine intended for motor operation, and for which the aim is high performance and at the same time a minimum of maintenance for brushes and commutator and/or a wide range of speeds. An example thereof is an application in a coiler motor. It shall be obvious though, that the principles of the invention are likewise applicable to a machine for generator operation A further variant, not illustrated in the drawings, that falls within the basic principles of the invention, is a design in which the outer cooling channels are positioned asymmetrically with reference to the rotor winding grooves, adapted to specific applications, for providing or compensating for different electromagnetic properties in different directions of rotation.

Furthermore, it shall be emphasized that even if the invention has been explained in the above specification with specific reference to an application of its principles in a direct current machine, it also covers an application in alternating current machines. An example of such a use of the invention is in asynchronous machines, and more specifically, preferably in such machines having a forced cooling. In alternating current machines the inventive principles can be employed for a strictly axial cooling as well as in combination with conventional radial cooling channels. The invention shall therefore also comprise such applications.

It will be understood by those skilled in the art that various modifications and changes may be made to the present invention without departure from the scope thereof, which is defined by the appended claims.

What is claimed is:

1. A method of improving the performance utilization of a rotary electric machine, said method comprising the steps of:

conducting a cooling fluid through axial cooling channels in said rotor separate from and radially inward of rotor winding grooves on said rotor, wherein the cooling fluid for mainly cooling the machine is conducted through said axial cooling channels or groups of said axial cooling channels that are provided in said rotor, each cooling channel or group of cooling channels being located within a uniform radial range from a center of said rotor, being essentially equally spaced circumferentially from each other and being essentially symmetrically disposed relative to said rotor winding grooves, and wherein said uniform radial range together with said essentially symmetrical disposition provides an essentially symmetrical magnetic flow path in said rotor.

2. The method according to claim 1, wherein a plurality of said axial cooling channels or groups of said axial cooling channels are positioned close to the rotor winding grooves.

3. The method according to claim 1, wherein the cooling fluid for mainly cooling the machine is conducted through cooling channels or groups of cooling channels in the rotor, which are provided in a number that is half the number of rotor winding grooves when the latter is even or in a number that is an integer multiple of the number of rotor winding grooves.

4. The method according to claim 1, wherein the cooling fluid for mainly cooling the machine is conducted through cooling channels that are formed having an enlarged peripheral surface and/or cross section area.

5. The method according to claim 1, wherein depending upon the intended application of the machine, the cooling fluid for mainly cooling the machine is conducted through axial cooling channels positioned symmetrically or asymmetrically with reference to the rotor winding grooves.

6. A rotary electric machine comprising:
a rotor with rotor winding grooves positioned around the circumference thereof,
a stator encircling the rotor; and
cooling channels formed in the rotor and extended in the axial direction of the rotor,
wherein the cooling channels or groups of cooling channels for mainly cooling the machine are provided separate from and radially inward of the rotor winding grooves distributed around a longitudinal axis of the machine, each cooling channel or group of cooling channels being located within a uniform radial range from a center of said rotor, being essentially equally spaced circumferentially from each other and being essentially symmetrically disposed relative to said rotor winding grooves, and wherein said uniform radial range together with said essentially symmetrical disposition provides an essentially symmetrical magnetic flow path in said rotor.

7. The rotary electric machine according to claim 6, wherein the cooling channels or groups of cooling channels in the rotor for mainly cooling the machine are provided in a number that is half the number of rotor winding grooves when the latter is even or in a number that is an integer multiple of the number of rotor winding grooves.

8. The rotary electric machine according to claim 7, wherein each of the cooling channels or groups of cooling channels for mainly cooling the machine are provided substantially in a radial plane passing through the longitudinal center plane of the respective rotor winding groove.

9. The rotary electric machine according to claim 7, wherein each of the cooling channels or groups of cooling channels for mainly cooling the machine are provided substantially in a radial plane passing midway between two adjacent rotor winding grooves.

10. The rotary electric machine according to claim 6, wherein the cooling channels for mainly cooling the machine are provided with an elongated cross section shape in the radial direction of the rotor and/or have a profiled inner peripheral surface.

11. The rotary electric machine according to claim 6, wherein the cooling channels or groups of cooling channels for mainly cooling the machine are provided at a radial distance from a center axis of the rotor, lying in the area of $R_2-R_1 \leq 8+D \cdot 0.03$ mm, where $R_2$ and $R_1$ denote radii from the center of the rotor in mm and D is the diameter of the rotor plate in mm and where $R_2$ is always larger than $R_1$.

12. The rotary electric machine according to claim 6, wherein the cooling channels or groups of cooling channels for mainly cooling the machine are provided at a radial distance from a center axis of the rotor, lying in the area of $R_2-R_1 \leq 5+D \cdot 0.02$ mm, where $R_2$ and $R_1$ denote radii from the center of the rotor in mm and D is the diameter of the rotor plate in mm and where $R_2$ is always larger than $R_1$.

13. The rotary electric machine according to claim 6, wherein, depending upon the intended application of the machine, the cooling channels or groups of cooling channels for mainly cooling the machine are provided symmetrically or asymmetrically with reference to the rotor winding grooves.

14. The rotary electric machine according to claim 6, wherein said machine is a direct current machine.

15. The rotary electric machine according to claim 6, wherein said machine is an alternating current machine.

16. A rotor of a rotary electric machine, having rotor winding grooves provided around a circumference thereof and having cooling channels extended in the axial direction of the rotor, wherein the cooling channels or groups of cooling channels for mainly cooling the machine are provided separate from and radially inward of the rotor winding grooves and distributed around the longitudinal axis of the machine, each cooling channel or group of cooling channels is located within a uniform radial range from a center of said rotor, is essentially equally spaced circumferentially from each other, and is essentially symmetrically disposed relative to said rotor winding grooves and with respect to the magnetic flow paths in the rotor, whereby symmetry is achieved in the magnetic circuit of the rotor.

17. The rotor according to claim 16, wherein the cooling channels or groups of cooling channels in the rotor for mainly cooling the machine are provided in a number that is half the number of rotor winding grooves when the latter is even or in a number that is an integer multiple of the number of rotor winding grooves.

18. The rotor according to claim 17, wherein each of the cooling channels or groups of cooling channels for mainly cooling the machine are provided substantially in a radial plane passing through the longitudinal center plane of the respective rotor winding grooves.

19. The rotor according to claim 17, wherein each of the cooling channels or groups of cooling channels for mainly cooling the machine are provided substantially in a radial plane passing mid-way between two adjacent rotor winding grooves.

20. The rotor according to claim 16, wherein the cooling channels for mainly cooling the machine are provided with an elongated cross section shape in the radial direction of the rotor and/or have a profiled inner peripheral surface.

21. The rotor according to claim 16, wherein the cooling channels or groups of cooling channels for mainly cooling the machine are provided at a radial distance from a center axis of the rotor, lying in the area of $R_2-R_1 \leq 8+D \cdot 0.03$ mm, where $R_2$ and $R_1$ denote radii from the center of the rotor in mm and D is the diameter of the rotor plate in mm and where $R_2$ is always larger than $R_1$.

22. The rotor according to claim 16, wherein the cooling channels or groups of cooling channels for mainly cooling the machine are provided at a radial distance from a center axis of the rotor, lying in the area of $R_2-R_1 \leq 5+D \cdot 0.02$ mm, where $R_2$ and $R_1$ denote radii from the center of the rotor in mm and D is the diameter of the rotor plate in mm and where $R_2$ is always larger than $R_1$.

23. The rotor according to claim 16, wherein, depending upon the intended application, the cooling channels or groups of cooling channels for mainly cooling the machine are provided symmetrically or asymmetrically with reference to the rotor winding grooves.

24. A method of cooling a rotor having rotor winding grooves comprising providing axial-aligned cooling channels in the rotor separate from and radially inward of the rotor winding grooves, each cooling channel located within a uniform radial range from a center of said rotor, essentially equally spaced circumferentially from each other, and essentially symmetrically disposed relative to said rotor winding grooves, wherein the cooling channels are substantially symmetrical relative to magnetic flow paths in the rotor and a magnetic circuit of the rotor is symmetrical.

25. A rotor having rotor winding grooves and axially-aligned cooling channels disposed separate from and radially inward of the rotor winding grooves, each cooling channel located within a uniform radial range from a center of said rotor, essentially equally spaced circumferentially from each other, and essentially symmetrically disposed relative to said rotor winding grooves, wherein the cooling channels are symmetrically disposed with respect to magnetic flow paths in the rotor and a magnetic circuit of the rotor is symmetrical.

26. A method of improving the performance utilization of a rotary electric machine, said method comprising the steps of:

conducting a cooling fluid through axial cooling channels in said rotor separate from and radially inward of rotor winding grooves on said rotor, wherein the cooling fluid for mainly cooling the machine is conducted through said axial cooling channels or groups of said axial cooling channels that are provided in said rotor, each cooling channel or group of cooling channels is provided at a radial distance from a center axis of the rotor, lying in the area of $R_2 - R_1 \leq 8 + D \cdot 0.03$ mm, where $R_2$ and $R_1$ denote radii from the center of the rotor in mm and D is the diameter of the rotor plate in mm and where $R_2$ is always larger than $R_1$.

27. The method according to claim 26, wherein a plurality of said axial cooling channels or groups of said axial cooling channels are positioned close to the rotor winding grooves.

28. The method according to claim 26, wherein the cooling fluid for mainly cooling the machine is conducted through cooling channels or groups of cooling channels in the rotor, which are provided in a number that is half the number of rotor winding grooves when the latter is even or in a number that is an integer multiple of the number of rotor winding grooves.

29. The method according to claim 26, wherein the cooling fluid for mainly cooling the machine is conducted through cooling channels that are formed having an enlarged peripheral surface and/or cross section area.

30. The method according to claim 26, wherein depending upon the intended application of the machine, the cooling fluid for mainly cooling the machine is conducted through axial cooling channels positioned symmetrically or asymmetrically with reference to the rotor winding grooves.

31. A method of improving the performance utilization of a rotary electric machine, said method comprising the steps of:

conducting a cooling fluid through axial cooling channels in said rotor separate from and radially inward of rotor winding grooves on said rotor, wherein the cooling fluid for mainly cooling the machine is conducted through said axial cooling channels or groups of said axial cooling channels that are provided in said rotor, each cooling channel or group of cooling channels are provided at a radial distance from a center axis of the rotor, lying in the area of $R_2 - R_1 \leq 5 + D \cdot 0.02$ mm, where $R_2$ and $R_1$ denote radii from the center of the rotor in mm and D is the diameter of the rotor plate in mm and where $R_2$ is always larger than $R_1$.

32. The method according to claim 31, wherein a plurality of said axial cooling channels or groups of said axial cooling channels are positioned close to the rotor winding grooves.

33. The method according to claim 31, wherein the cooling fluid for mainly cooling the machine is conducted through cooling channels or groups of cooling channels in the rotor, which are provided in a number that is half the number of rotor winding grooves when the latter is even or in a number that is an integer multiple of the number of rotor winding grooves.

34. The method according to claim 31, wherein the cooling fluid for mainly cooling the machine is conducted through cooling channels that are formed having an enlarged peripheral surface and/or cross section area.

35. The method according to claim 31, wherein depending upon the intended application of the machine, the cooling fluid for mainly cooling the machine is conducted through axial cooling channels positioned symmetrically or asymmetrically with reference to the rotor winding grooves.

* * * * *

UNITED STATES PATENT AND TRADEMARK OFFICE
CERTIFICATE OF CORRECTION

PATENT NO.    : 6,483,210 B1
DATED         : November 19, 2002
INVENTOR(S)   : Christer Soderberg It is certified that error appears in the above-identified patent and that said Letters Patent is hereby corrected as shown below:

Column 8,
Line 54, change "said rotor" to -- a rotor --.

Column 11,
Line 26, change "said rotor" to -- a rotor --.

Column 12,
Line 15, change "said rotor" to -- a rotor --.

Signed and Sealed this

Thirteenth Day of May, 2003

JAMES E. ROGAN
*Director of the United States Patent and Trademark Office*